(12) United States Patent
Ma et al.

(10) Patent No.: US 11,746,654 B2
(45) Date of Patent: Sep. 5, 2023

(54) KIND OF NO-PILLAR AND GOB-SIDE ENTRY RETAINING MINING AND CONSTRUCTION METHOD WITHOUT THE MINING AREA DIVISION

(71) Applicant: SHANDONG UNIVERSITY OF SCIENCE AND TECHNOLOGY, Qingdao (CN)

(72) Inventors: Qihua Ma, Qingdao (CN); Zhongcheng Qin, Qingdao (CN); Kegong Fan, Qingdao (CN); Jianguo Ning, Qingdao (CN); Zhongping Guo, Qingdao (CN); Zhijie Wen, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 17/054,677

(22) PCT Filed: Mar. 24, 2020

(86) PCT No.: PCT/CN2020/080949
§ 371 (c)(1),
(2) Date: Nov. 11, 2020

(87) PCT Pub. No.: WO2021/031561
PCT Pub. Date: Feb. 25, 2021

(65) Prior Publication Data
US 2023/0103613 A1    Apr. 6, 2023

(30) Foreign Application Priority Data

Jan. 21, 2020  (CN) ......................... 202010070706.0

(51) Int. Cl.
*E21C 41/18*    (2006.01)
*E21F 1/00*    (2006.01)
*E21F 13/06*    (2006.01)

(52) U.S. Cl.
CPC .............. *E21C 41/18* (2013.01); *E21F 1/006* (2013.01); *E21F 13/06* (2013.01)

(58) Field of Classification Search
CPC ............ E21C 41/18; E21F 1/006; E21F 13/06
See application file for complete search history.

(56) References Cited

U.S. PATENT DOCUMENTS 11,008,860 B2 *   5/2021   He ......................... E21D 15/00

* cited by examiner

*Primary Examiner* — Janine M Kreck
(74) *Attorney, Agent, or Firm* — CBM Patent Consulting, LLC

(57) ABSTRACT

A method is to excavate main roadways in the upper and lower parts separately and an inclined intake roadway in the central part of the mine and pre-excavate an inclined seam roadway as the first mining face at the boundary on one side of the mine. Staring from the mine boundary, the retreating mining shall be carried out on the first mining face strip by strip with belt conveyors arranged in the upper main roadway and assistant conveying devices in the lower main roadway and inclined intake roadway; the open-off cut of the first mining face shall be built on the underside of the upper main roadway at the boundary of the mine to carry out the downward inclined mining on the strike and along the inclination.

2 Claims, 4 Drawing Sheets

KIND OF NO-PILLAR AND GOB-SIDE ENTRY RETAINING MINING AND CONSTRUCTION METHOD WITHOUT THE MINING AREA DIVISION

TECHNICAL FIELD

This invention belongs to the technical field of coal mining.

BACKGROUND ART

As is known to all, most of the current coal mining methods are to first divide the mine into stages, then divide each stage into several mining areas and each mining area into several sections and finally retain pillars in each section and pre-excavate a mining roadway to form a mining face.

This mining method not only causes too many roadways and high cost but also needs to retain pillars of certain widths between stages, mining areas, sections, upward minings, and both sides of the upward mining Various pillars retained not only cause the great loss of coal resources but also often become the root cause of spontaneous combustion of coals, the concentration of mine ground pressure, and even the rock burst.

Therefore, we disclose a kind of "no-pillar and gob-side entry retaining mining method suitable for gently inclined coal seams" in the invention CN107725053A. However, this no-pillar and gob-side entry retaining mining method can only be realized in the mining area, and has the problem of downgoing polluted air when two staggered mining faces are mined; besides, the mine still needs to be divided into stages and sections, and pillars of certain widths still need to be retained for protection and isolation purposes between roadways of two stages, mining areas, upward minings and both sides of the upward mining.

DESCRIPTION OF THE INVENTION

This invention aims at overcoming deficiencies in the existing technology and proposing a kind of no-pillar and gob-side entry retaining mining and construction method without the mining area division.

This no-pillar and gob-side entry retaining mining method adopts the following technical solution:

First: Construct main and auxiliary shafts at the upper boundary in the middle part of the mine, an upper main roadway along the seam at the upper boundary of the mine, a shaft station on the horizontal plane at the intersection of the main and auxiliary shafts and the upper main roadway, a lower main roadway along the seam at the lower boundary of the mine, an inclined intake roadway in the central part along the seam of the mine connecting with the shaft station and the lower main roadway and an inclined seam roadway at the boundary of the mine running through the upper and lower main roadways, forming a mine ventilation system that intakes air from the lower main roadway and returns air from the upper main roadway; arrange belt conveyors in the upper main roadway to form a coal transport system and assistant conveying devices in the lower main roadway and inclined intake roadway to form an auxiliary transport system;

Second: Provide open-off cuts as the first mining face at the mine boundary of the upper roadway to carry out the downward inclined mining on the first mining face on the strike and along the inclination, during which a roadway shall be automatically formed (i.e. the inclined return roadway for transport) and the gob-side entry shall be retained to serve as the inclined return roadway for the transport of the adjacent next mining face;

Third: After the downward inclined mining in the first mining face advances to the lower main roadway, move it to the open-off cut on its adjacent mining face (i.e. the second mining face open-off cut) to carry out upward topple mining; after the mining advances to the upper main roadway, move it to the next open-off cut on its adjacent mining face (i.e. the third mining face open-off cut) to repeat the downward inclined mining in the first mining face; after the mining advances to the lower main roadway, move it to the open-off cut on its adjacent mining face (i.e. the fourth mining face open-off cut) to repeat the upward topple mining in the second mining face; the following mining shall be carried out upward and downward in such a cyclic manner until one wing of the mine is completely mined.

In order to realize the above mining method, the specific construction steps of the invention are as follows:

Step I: Build main and auxiliary shafts at the upper boundary in the middle part of the mine until reaching the designed elevation of the upper main roadway, connect them and then construct the shaft station, forming the mine hoisting system and ventilation system; then arrange one team to excavate the upper main roadway and another team to excavate the central inclined intake roadway of the shaft to the designed elevation of the lower main roadway and then to the lower main roadway; after the excavation of the upper and lower main roadways reaches the boundary of the mine, connect them to serve as an inclined intake roadway of the first mining face, forming a mine ventilation system that intakes air from the lower main roadway and returns air from the upper main roadway; Meanwhile, the upper main roadway adopts the form of integration of machine and rail to act as the main roadway for the auxiliary transport of mine materials and equipment and main transport of coals;

Step II: Widen the local roadway to form an open-off cut at the mining boundary of the upper main roadway and install three machines (coal cutters, scraper conveyors, and hydraulic supports, the same below) to form the first mining face for inclined mining;

Step III: Carry out the downward inclined mining in the first mining face to form an inclined return roadway along the mining face and retain a gob-side entry to serve as the inclined return roadway for the adjacent mining face;

Provide extensible belt conveyors in the inclined return roadway of the mining face to transport coals of this mining face and the adjacent mining face;

Install monorail hoists in the upper main roadway and the inclined return roadway of the mining face to transport materials and equipment and serve as assistant conveying devices for the adjacent mining face;

During the mining process in the first mining face, coals are transported from the mining face to the upper main roadway passing through the inclined return roadway and then to the shaft coal pocket; materials and equipment required in the mining face shall be hoisted to the mining face by using the monorail hoist after passing through the shaft station, upper main roadway and inclined return roadway; the fresh air shall flow from the auxiliary shaft to the lower main roadway after passing through the shaft station and the central inclined intake roadway, and then to the mining face after passing through the inclined intake roadway; the polluted air produced from the mining face shall be discharged from the inclined return roadway to the main shaft (double as the return shaft) or special return shaft after passing through the upper main roadway;

Step IV: Before the downward inclined mining in the first mining face ends in the lower main roadway, widen the upper side of the lower main roadway at the designed open-off cut position of the second mining face to the open-off cut width required for installing three machines in the mining face; then, horizontally move three machines in the mining face to the open-off cut for installation to form a topple mining face and use the belt conveyors and monorail hoists in the inclined return roadway to perform the transport task for the adjacent mining face in turn; carry out the upward topple mining in the second mining face to automatically form an inclined intake roadway and retain a gob-side entry to serve as an inclined intake roadway for the next adjacent mining face, i.e. the third mining face.

During the upward topple mining in the second mining face, coals are transported from the mining face to the upper main roadway passing through the inclined return roadway and then to the shaft coal pocket; materials and equipment required in the mining face shall be hoisted to the working face by using the monorail hoist after passing through the shaft station, upper main roadway and inclined return roadway; the fresh air shall flow from the auxiliary shaft to the lower main roadway after passing through the shaft station and inclined intake roadway, and then to the mining face after passing through the inclined intake roadway; the polluted air produced from the mining face shall be discharged from the inclined return roadway to the main shaft (double as the return shaft) after passing through the upper main roadway;

Step V: Before the upward topple mining in the second mining face ends in the upper main roadway, widen the lower side of the upper main roadway at the open-off cut position of the designed third mining face to the open-off cut width required for installing three machines in the mining face; then, horizontally move three machines in the mining face to the open-off cuts for installation to form a downward inclined mining face again; the following steps are the same as the Step 3 and Step 4 until one wing of the mine is completely mined. Similarly, the other wing of the double-wing mine shall be mined and constructed according to the above method.

Compared with existing technologies, the invention has achieved beneficial effects as follows:

1. Compared with the no-pillar and gob-side entry retaining mining method suitable for gently inclined coal seams, this mining method can realize the ascending, instead of descending, of the polluted air produced from the mining face, which can avoid gas accumulation and is beneficial to the safety production.
2. Compared with the no-pillar and gob-side entry retaining mining method suitable for gently inclined coal seams, this mining method does not divide the mining area and retain coal pillars, which can reduce the pillar loss and improve the recovery rate.
3. Compared with the existing mining method, this invention builds the shaft, shaft station, and upper main roadway at boundaries of the mine, which significantly shortens the shaft depth and the time limit for constructing the shaft and thus saves the initial investment.
4. In this mining method, starting from the mine boundary, the retreating mining shall be carried out in the mining face strip by strip. There is no need to retain main roadways to protect pillars and there is no pillar mining between adjacent mining faces. This not only improves the recovery rate of coal resources but also helps to prevent the spontaneous combustion of coal pillars, rock burst, and other mine disasters.
5. The monorail hoists are used for auxiliary transport to hoist materials and equipment from the shaft station directly to the mining face. Compared with traditional rail transport, this reduces the turnover link and improves the auxiliary transport efficiency.
6. The inclined roadway as the mining face formed by adopting the gob-side entry retaining technique with roof cutting and pressure relief and the belt conveyors and monorail hoists in it are all reutilized for the adjacent mining face, which not only reduces the workload of equipment removal and installation but also saves the removal and installation cost and labor cost.
7. When moving the mining face to another one, miners only need to move three machines in the former mining face to the open-off cut of its adjacent mining face, which greatly shortens the moving distance and significantly reduces the workload of equipment removal and installation and the time wasted for changing the mining face.
8. Compared with the coal transporting through the lower main roadway in the traditional mining face, this mining method transports coals in the mining face upward to the shaft coal pocket after passing through the upper main roadway and solves the to-and-fro transport problem of first downward transport and then upward transport in the traditional mining system, which significantly reduces the transport link, shortens the transport distance, improves the transport efficiency, and saves the transport cost.

BRIEF DESCRIPTION OF THE FIGURES

FIG. 1 to FIG. 3 are schematic diagrams of roadway layouts and mining steps implemented in this invention, among which:

FIG. 1 is the layout diagram of the mining face division in one wing of the mine;

FIG. 2 is the schematic diagram of downward inclined mining in the first mining face;

FIG. 3 is the schematic diagram of upward topple mining in the second mining face;

In these figures: 1—Upper main roadway, 2—Lower main roadway, 3—Mining face, 4—Inclined intake roadway of the first mining face, 5—Open-off cut of the first mining face, 6—First mining face, 7—Inclined return roadway of the first mining face, 8—Open-off cut of the second mining face, 9—Second mining face, 10—Inclined intake roadways of the second and third mining faces, 11—Open-off cut of the third mining face, 12—Main shaft, 13—Auxiliary shaft, 14—Shaft station, 15—Central inclined intake roadway of the shaft.

DETAILED EMBODIMENTS

Figure 1:
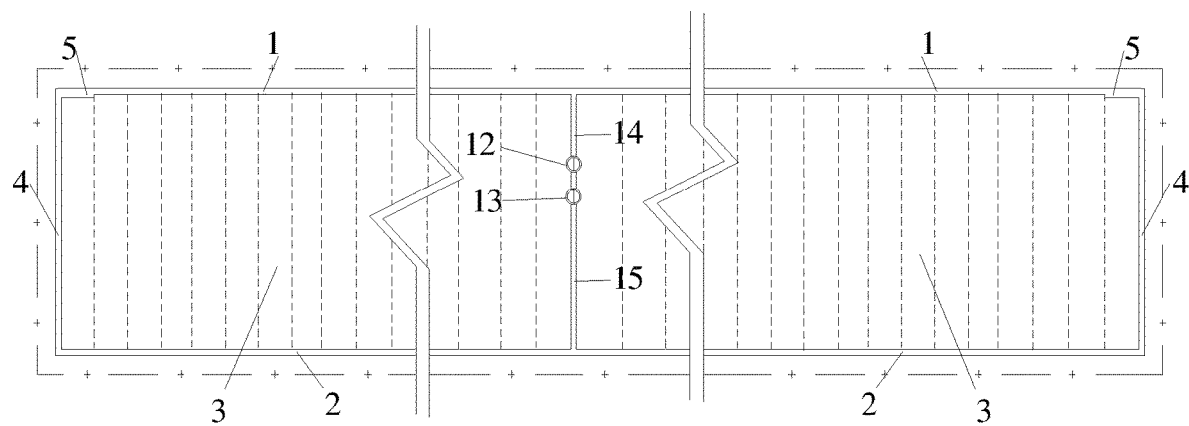
Figure 4:
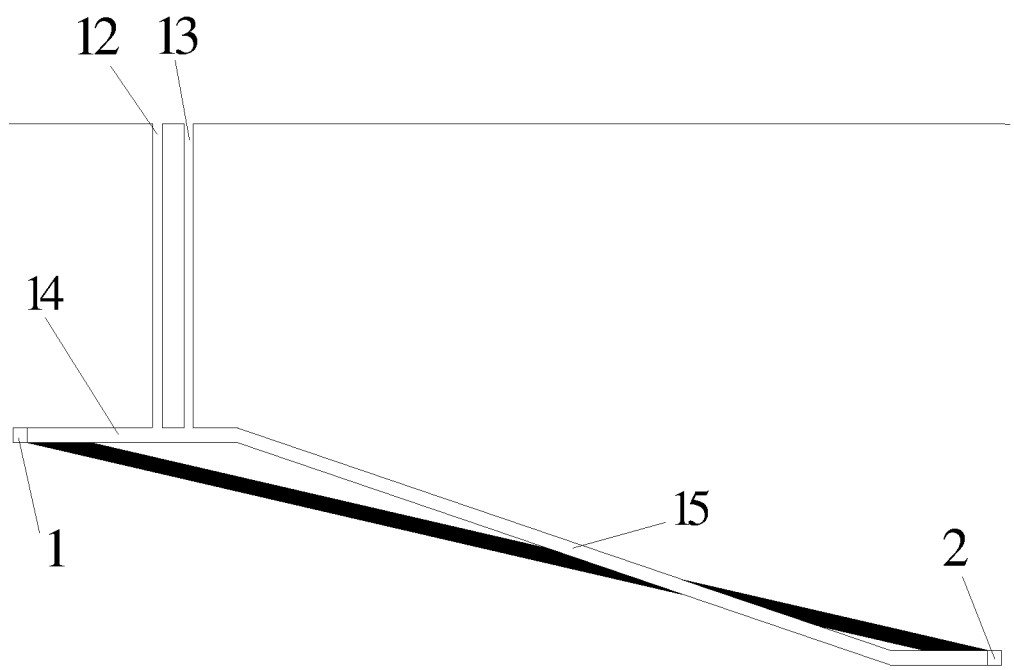
FIG. 4 is the layout diagram of shafts and main roadways.

The invention is further described in combination with the attached figures as follows:

A kind of no-pillar and gob-side entry retaining mining and construction method without the mining area division, which comprises the following steps:

1) As shown in FIG. 1 and FIG. 4, build the main shaft 12 and auxiliary shaft 13 at the upper boundary in the middle part of the mine until reaching the designed elevation of the upper main roadway 1, connect them and then construct the shaft station 14, forming the mine hoisting system and ventilation system; then excavate the upper main roadway 1 along the upper boundary of the mine and excavate the central inclined intake roadway 15 of the shaft along the central inclination of the mine from the shaft station to the designed elevation of the lower main roadway 2 and then to the lower main roadway 2 along the lower boundary of the mine to divide one wing of the mine into several mining faces 3; after the excavation of the upper and lower main roadways reaches boundaries of one wing of the mine, excavate the inclined intake roadway 4 for the first mining face along the inclination of the mine boundary and connect the upper and lower main roadways to form a mine ventilation system that intakes air from the lower main roadway and returns air from the upper main roadway. Meanwhile, the upper main roadway 1 adopts the form of integration of machines and rails to act as the main roadway for the auxiliary transport of mine materials and equipment and main transport of coals.

2) Construct an open-off cut 5 at the designed position of the first mining face in the upper main roadway 1 and install three machines (coal cutters, scraper conveyors, and hydraulic supports, the same below) at the open-off cut.

3) Carry out the downward inclined mining in the first mining face to automatically form a roadway and retain a gob-side entry in the next adjacent mining face during the mining process, which shall serve as the inclined return roadway 7 of the first mining face and the inclined return roadway 9 of the second mining face. The fresh air shall flow from the auxiliary shaft 13 to the lower main roadway 2 after passing through the shaft station 14 and the central inclined intake roadway 15, and then to the first mining face 6 after passing through the inclined intake roadway 4; the polluted air produced from the first mining face shall be discharged from the inclined return roadway 7 of the first mining face to the main shaft 12 (double as the return shaft) or special return shaft after passing through the upper main roadway 1.

Provide extensible belt conveyors in the inclined return roadway 7 of the first mining face, which shall extend as the mining face advances and be reutilized for the second mining face 9 after the work in the first mining face is finished.

Meanwhile, install monorail hoists in the inclined return roadway 7 of the first mining face, which shall serve as the assistant conveying devices for the first mining face and be reutilized for the second mining face 9 after the work in the first mining face is finished.

Figure 2:
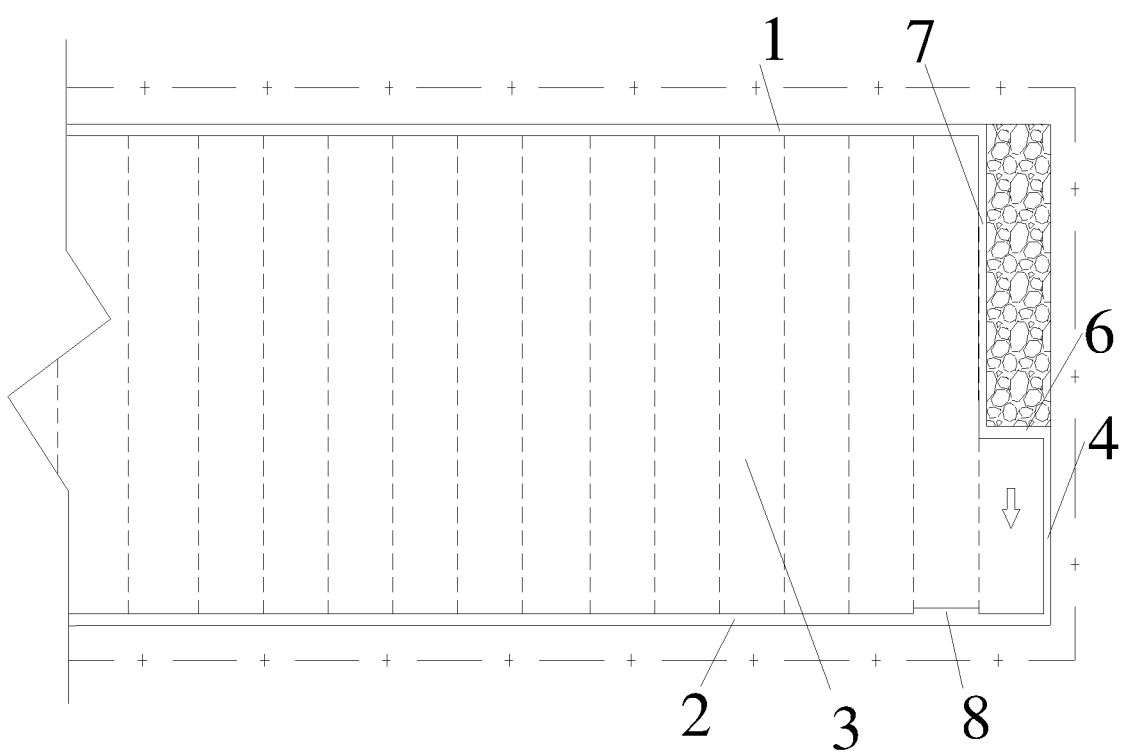

During the mining process in the first mining face 6, coals are transported from the first mining face 6 to the upper main roadway 1 after passing through the inclined return roadway 7 and then to the shaft coal pocket; materials and equipment required in the mining face shall be hoisted to the mining face by using the monorail hoist after passing through the upper main roadway 1 and inclined return roadway 7; the fresh air shall flow from the auxiliary shaft 13 to the first mining face 6 after passing through the central inclined intake roadway 15, lower main roadway 2 and inclined intake roadway 4 of the first mining face; the polluted air produced from the mining face shall be discharged from the inclined return roadway 7 to the main shaft (double as the return shaft) after passing through the upper main roadway 1, as shown in FIG. 2.

4) Before the mining in the first mining face 6 ends, widen the designed open-off cut 8 in the second mining face. After the mining in the first mining face 6 ends, move three machines to the open-off cut 8 of the second mining face and reutilize the belt conveyors and monorail hoists in the inclined return roadway 7 of the first mining face to perform the transport task for the second mining face 9; during the mining in the second mining face, automatically form a roadway close to the third mining face and retain a gob-side entry to serve as the inclined intake roadway 10 for the second and third mining faces.

Figure 3:
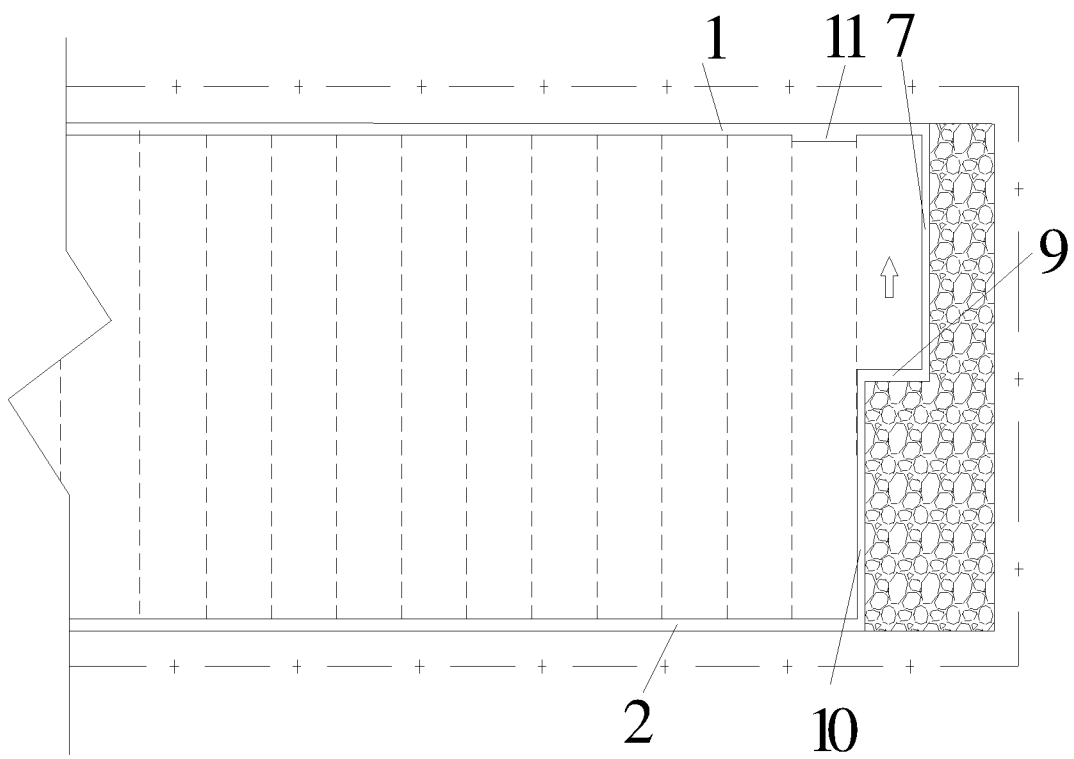

During the mining process in the second mining face 9, coals are transported from the mining face 9 to the upper main roadway 1 after passing through the inclined return roadway 7 and then to the shaft coal pocket; materials and equipment required in the mining face shall be hoisted to the mining face 9 by using the monorail hoist after passing through the upper main roadway 1 and inclined return roadway 7; the fresh air shall flow from the auxiliary shaft 13 to the second mining face 9 after passing through the central inclined intake roadway 15, lower main roadway 2 and inclined intake roadway 10 of the mining face; the polluted air produced from the mining face shall be discharged from the inclined return roadway 7 to the main shaft (double as the return shaft) after passing through the upper main roadway 1, as shown in FIG. 3.

5) Before the mining in the second mining face 9 ends, widen the designed open-off cut 11 in the third mining face. After the mining in the mining face 9 ends, move three machines to the open-off cut 11 of the third mining face for installation; then, carry out the downward inclined mining in the mining face. The following steps are the same as Step 3 and Step 4 until one wing of the mine is completely mined. Similarly, the other wing of the double-wing mine shall be mined according to the above method.

Certainly, the above description is only a comparatively good embodiment of this invention. This invention is not limited to the embodiment enumerated above. It should be noted that any equivalent substitutes and obvious variants of this invention made by any technical personnel familiar with this field under the guidance of this description shall fall within the substantial scope of the description and be protected by the invention.

What is claimed is:

1. A no-pillar and gob-side entry retaining mining and construction method without mining area division, which is characterized in that it comprises the following steps:

first: construct main and auxiliary shafts at a upper boundary in a middle part of a mine, an upper main roadway along a seam at the upper boundary of the mine, a shaft station on a horizontal plane at an intersection of main and auxiliary shafts and the upper main roadway, a lower main roadway along the seam at a lower boundary of the mine, an inclined intake roadway in central part along the seam of the mine connecting with the shaft station and the lower main roadway and an inclined seam roadway at a boundary of the mine running through the upper and lower main roadways, forming a mine ventilation system that intakes air from the lower main roadway and returns air from the upper main roadway; arrange belt conveyors in the upper main roadway to form a coal transport system and assistant conveying devices in the lower main roadway and inclined intake roadway to form an auxiliary transport system;

second: provide open-off cuts as the first mining face at the mine boundary of the upper roadway to carry out a downward inclined mining in the first mining face on the strike and along the inclination, during which a roadway shall be automatically formed (i.e. an inclined return roadway for transport) and a gob-side entry shall be retained to serve as the inclined return roadway for transport of an adjacent next mining face;

third: after the downward inclined mining in the first mining face advances to the lower main roadway, move it to an open-off cut on its adjacent mining face, i.e. a second mining face open-off cut, to carry out upward alley; after the mining advances to the upper main roadway, move it to a next open-off cut on its adjacent mining face, i.e. a third mining face open-off cut, to repeat the downward inclined mining in the first mining face; after the mining advances to the lower main roadway, move it to the open-off cut on its adjacent mining face, i.e. a fourth mining face open-off cut, to repeat the upward alley in the second mining face; the mining of subsequent working face shall be carried out upward and downward in such a cyclic manner until one wing of the mine is completely mined.

2. The method according to claim 1, which is characterized in that it comprises the following steps:

step I: build main and auxiliary shafts at the upper boundary in the middle part of the mine until reaching the designed elevation of the upper main roadway, connect them and then construct the shaft station, forming a mine hoisting system and ventilation system; then arrange one team to excavate the upper main roadway and another team to excavate a central inclined intake roadway of a shaft to the designed elevation of the lower main roadway and then to the lower main roadway; after the excavation of the upper and lower main roadways reaches the boundary of the mine, connect them to serve as the inclined intake roadway of the first mining face, forming a mine ventilation system that intakes air from the lower main roadway and returns air from the upper main roadway; meanwhile, the upper main roadway adopts the form of machine-rail integration to act as the main roadway for the auxiliary transport of mine materials and equipment and main transport of coals;

step II: widen a local roadway to form an open-off cut at the mining boundary of the upper main roadway and install three machines (coal cutters, scraper conveyors, and hydraulic supports) to form the first mining face for inclined mining;

step III: carry out the downward inclined mining in the first mining face to form an inclined return roadway along the mining face and retain a gob-side entry to serve as the inclined return roadway for the adjacent mining face;

provide extensible belt conveyors in the inclined return roadway of the mining face to transport coals of this mining face and the adjacent mining face;

install monorail hoists in the upper main roadway and the inclined return roadway of the mining face to transport materials and equipment and serve as assistant conveying devices for the adjacent mining face;

during the mining process in the first mining face, coals are transported from the mining face to the upper main roadway passing through the inclined return roadway and then to the shaft coal pocket; materials and equipment required in the mining face shall be hoisted to the mining face by using the monorail hoist after passing through the shaft station, upper main roadway and inclined return roadway; the fresh air shall flow from the auxiliary shaft to the lower main roadway after passing through the shaft station and the central inclined intake roadway, and then to the mining face after passing through the inclined intake roadway; the polluted air produced from the mining face shall be discharged from the inclined return roadway to the main shaft (double as the return shaft) or special return shaft after passing through the upper main roadway;

step IV: before the downward inclined mining in the first mining face ends in the lower main roadway, widen the upper side of the lower main roadway at the designed open-off cut position of the second mining face to the open-off cut width required for installing three machines in the mining face; then, horizontally move three machines in the mining face to the open-off cut for installation to form a alley face and use the belt conveyors and monorail hoists in the inclined return roadway to perform a transport task for the adjacent mining face in turn; carry out the upward alley in the second mining face to automatically form the inclined intake roadway and retain a gob-side entry to serve as the inclined intake roadway for the next adjacent mining face, i.e. the third mining face;

during the upward alley in the second mining face, coals are transported from the mining face to the upper main roadway passing through the inclined return roadway and then to the shaft coal pocket; materials and equipment required in the mining face shall be hoisted to the working face by using the monorail hoist after passing through the shaft station, upper main roadway and inclined return roadway; the fresh air shall flow from the auxiliary shaft to the lower main roadway after passing through the shaft station and inclined intake roadway, and then to the mining face after passing through the inclined intake roadway; the polluted air produced from the mining face shall be discharged from the inclined return roadway to the main shaft (double as the return shaft) after passing through the upper main roadway;

step V: before the upward alley in the second mining face ends in the upper main roadway, widen the lower side of the upper main roadway at the open-off cut position of the designed third mining face to the open-off cut width required for installing three machines in the mining face; then, horizontally move three machines in the mining face to the open-off cuts for installation to form a downward inclined mining face again; the following steps are the same as the step III and step IV until one wing of the mine is completely mined, similarly, an other wing of a double-wing mine shall be mined and constructed according to the above method.

* * * * *